Aug. 2, 1932.                C. A. SABBAH                1,870,027
                  ELECTRIC POWER CONVERTING APPARATUS
                         Filed July 30, 1930
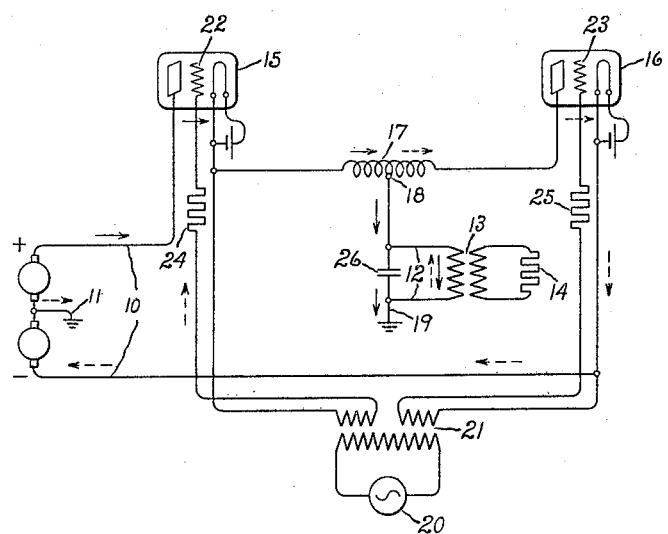
Inventor:
Camil A. Sabbah,
by Charles E. Tullar
His Attorney.

Patented Aug. 2, 1932

1,870,027

UNITED STATES PATENT OFFICE

CAMIL A. SABBAH, OF SCHENECTADY, NEW YORK, ASSIGNOR TO GENERAL ELECTRIC COMPANY, A CORPORATION OF NEW YORK

ELECTRIC POWER CONVERTING APPARATUS

Application filed July 30, 1930. Serial No. 471,876.

My invention relates to electric power converting apparatus for transferring energy between alternating and direct current systems and more particularly to such converting apparatus for transferring electric energy from a three-wire direct current system provided with a grounded neutral to an alternating current system.

In the so-called series type of inverter, energy is transmitted from a direct current system to an alternating current system through a plurality of electric valves connected in series across the direct current system. In order to produce an alternating current output in this type of inverter, it has been necessary heretofore to provide a pair of condensers connected in series across the direct current system and in shunt to the electric valves. These condensers carried the full load current of the alternating current output and consequently, in large installations, were very bulky and very expensive.

It is an object of my invention to provide new and improved electric power converting apparatus which eliminates the expensive series condensers and the attendant complexities heretofore required in converting apparatus of this type.

In the accompanying drawing I have illustrated diagrammatically what I at present consider to be the preferred embodiment of my invention as applied in a three-wire direct current system provided with a grounded neutral and, although my invention is particularly applicable for use in connection with such a system, it is to be understood that it is of general application in connection with other direct current systems.

In the drawing a direct current system 10 is shown as provided with a neutral ground connection 11, and connected to an alternating current system 12 by means of electric valves 15 and 16 and a reactor 17. The terminals of the alternating current system 12 are connected to the midpoint 18 of the reactor 17 and to ground through the connection 19. A condenser 26 is connected across the alternating current terminals to facilitate the commutation of current between the electric valves. If desired, a transformer 13, as illustrated in the drawings, may be interposed between the alternating current system 12 and the load 14.

The grid excitation of the electric valves 15 and 16 is shown as supplied from an alternating current source 20 through the grid transformer 21, the secondaries of which are connected to the grids 22 and 23 of the valves 15 and 16 through the current limiting resistors 24 and 25 respectively.

The electric valves 15 and 16 may be of any of the various types of electric valves controlled by an auxiliary electrode, as are well known in the art, but I prefer to use vapor electric discharge devices provided with incandescent cathodes and an ionizable gas or vapor at low pressure, such as argon or mercury vapor, in which the starting of the current through the device is controlled by the potential of a grid interposed between the cathode and anode. However, these devices may be of the pure electron discharge type in which the instantaneous current is continuously under the control of the grid. If this latter type of device is used, the reactor 17 may be omitted from the circuit.

While I have shown the grid excitation as derived from an independent source of alternating current, it will be understood by those skilled in the art that this excitation may be supplied directly from the output circuit 12 or from a circuit having a natural period of oscillation, loosely coupled with the output circuit and deriving energy from it without departing from my invention in its broader aspects.

The operation of the above described system when operating as an inverter, transmitting energy from the direct current circuit 10 to the alternating current circuit 12, will be clear to those skilled in the art by inspection of the current flow through the system as indicated by the arrows. Assuming that the valves 15 and 16 are of the vapor electric type and that the grid 22 of the valve 15 is charged to such a potential relative to its cathode that the valve 15 becomes conducting, the current flows as shown by the solid arrows. At the end of the first half cycle of the grid potential, the valve 15 is made non-conducting and the valve 16 is made conducting. The current flow during this half cycle is indicated by the dotted arrows. As the valves 15 and 16 are of the vapor electric type, the current through them will not be interrupted by the reversal of grid potential alone, but at the instant that the potential of the grids 22 and 23 reverses, the voltage across the valve 16 will be much higher than that across the valve 15 and current will begin to flow through the former valve. It will be noted that this current flows through the right hand portion of the reactor 17, thus producing a counter-voltage in the left hand portion, which opposes the voltage across the valve 16 and instantaneously interrupts the current in that valve. This cycle will be repeated indefinitely.

While I have shown and described what I at present consider the preferred embodiment of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States is:—

1. The combination of an alternating current system, a direct current system provided with a point of intermediate fixed potential, and means for interchanging energy between said systems in either direction comprising a plurality of electric valves and a reactor connected serially across said direct current system, means for periodically rendering said valves alternately conductive and non-conductive, and connections from said alternating current system to an intermediate point of said reactor and to said intermediate point in said direct current system respectively.

2. In combination, a direct current system provided with a grounded neutral, an alternating current system, and means for transferring power from said direct current system to said alternating current system comprising a pair of electric valves and a reactor connected serially across said direct current system, means for periodically rendering said valves alternately conductive and non-conductive, and connections from said alternating current system to the midpoint of said reactor and to ground respectively.

In witness whereof, I have hereunto set my hand this 29th day of July, 1930.

CAMIL A. SABBAH.